United States Patent
Marinov

(10) Patent No.: US 10,369,640 B2
(45) Date of Patent: Aug. 6, 2019

(54) MITER SAW INCLUDING A CHAIN DRIVE

(71) Applicant: Robert Bosch GmbH, Stuttgart (DE)

(72) Inventor: Plamen V. Marinov, Mount Prospect, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 88 days.

(21) Appl. No.: 15/101,948

(22) PCT Filed: Dec. 8, 2014

(86) PCT No.: PCT/US2014/069075
§ 371 (c)(1),
(2) Date: Jun. 6, 2016

(87) PCT Pub. No.: WO2015/088963
PCT Pub. Date: Jun. 18, 2015

(65) Prior Publication Data
US 2016/0303667 A1    Oct. 20, 2016

Related U.S. Application Data

(60) Provisional application No. 61/914,654, filed on Dec. 11, 2013.

(51) Int. Cl.
*B23D 45/04* (2006.01)
*B23D 47/12* (2006.01)

(52) U.S. Cl.
CPC ........... *B23D 47/12* (2013.01); *B23D 45/044* (2013.01); *B23D 45/046* (2013.01); *B23D 45/048* (2013.01)

(58) Field of Classification Search
CPC .... B23D 47/12; B23D 45/044; B23D 45/046; B23D 45/048
(Continued)

(56) References Cited

U.S. PATENT DOCUMENTS 4,620,367 A * 11/1986 Tubesing ............ B27B 17/0016
30/122
5,285,708 A    2/1994 Bosten et al.
(Continued)

FOREIGN PATENT DOCUMENTS

| CN | 200999837 Y | 1/2008 |
| EP | 1878525 A1 | 1/2008 |

OTHER PUBLICATIONS

International Search Report and Written Opinion corresponding to PCT Application No. PCT/US2014/069075, dated Apr. 17, 2015 (17 pages).
(Continued)

*Primary Examiner* — Ghassem Alie
*Assistant Examiner* — Nhat Chieu Q Do
(74) *Attorney, Agent, or Firm* — Maginot Moore & Beck LLP

(57) ABSTRACT

A powered saw including a saw blade configured to cut a workpiece and driven by a drive train having a narrow profile. The powered saw includes a miter saw having a chain drive disposed in a housing having a narrow profile. The powered saw includes a blade support assembly configured to reduce or eliminate interference between a workpiece and the powered saw. The miter saw enables a user to make right angle cuts, left angle cuts, and zero cuts of tall and atypically sized workpieces.

13 Claims, 4 Drawing Sheets

(58) Field of Classification Search
USPC .................................................. 83/485–491
See application file for complete search history.

(56) References Cited

U.S. PATENT DOCUMENTS

| | | | | |
|---|---|---|---|---|
| 5,425,294 | A * | 6/1995 | Ushiwata | B23D 45/044 |
| | | | | 83/468.3 |
| 6,866,568 | B1 * | 3/2005 | Liao | B23D 45/042 |
| | | | | 125/13.01 |
| 7,347,131 | B2 | 3/2008 | Gass | |
| 8,176,823 | B2 | 5/2012 | Lawlor | |
| 9,174,289 | B2 * | 11/2015 | Ginocchini | B23D 45/048 |
| 2002/0152867 | A1 | 10/2002 | Meredith et al. | |
| 2003/0110912 | A1 * | 6/2003 | English | B26D 1/22 |
| | | | | 83/420 |
| 2008/0011140 | A1 * | 1/2008 | Choi | B23D 45/042 |
| | | | | 83/491 |
| 2010/0238189 | A1 * | 9/2010 | Feng | G09G 3/3426 |
| | | | | 345/589 |
| 2010/0242700 | A1 | 9/2010 | Cox | |
| 2013/0055873 | A1 * | 3/2013 | Cox | B23D 45/044 |
| | | | | 83/471.2 |
| 2014/0020539 | A1 * | 1/2014 | Ginocchini | B23D 45/048 |
| | | | | 83/471.2 |

OTHER PUBLICATIONS

Supplementary European Search Report corresponding to European Patent Application No. 14 86 9158 (7 pages).

* cited by examiner

MITER SAW INCLUDING A CHAIN DRIVE

PRIORITY CLAIM

This application is a non-provisional utility application of and claims priority to U.S. Provisional Application No. 61/914,654, filed on Dec. 11, 2013, the entire disclosure of which is incorporated herein by reference.

FIELD

This disclosure relates generally to the field of powered saws, and more particularly to a powered miter saw configured to cut a workpiece at left miter angles, at right miter angles, and at a zero miter angle.

BACKGROUND

A miter saw uses a rotating saw blade to make crosscuts in a workpiece. The miter saw is adjustable, and when properly set up by a user, accurate crosscuts and accurate miter cuts are possible.

Miter saws are used for cutting many different types of material, including lumber of different types as well as synthetic materials. The typical miter saw includes a base or a platform on which a turntable is positioned. The turntable includes a workpiece support surface to support a workpiece to be cut by the miter saw. A support assembly is coupled to the turntable and functions to support a cutting assembly that is operable to perform a cutting operation on the work piece. The support assembly includes adjustable components which enable the cutting assembly to move away from or toward the support surface in order to cut the workpiece. The support assembly also typically includes other adjustable components configured to pivot the cutting assembly about an angle inclined with respect to the support surface in order to produce beveled or angled cuts on the work piece.

Tall workpieces, such as base boards and crown moldings, can be cut only at zero and left miter angles with a conventional miter saw. Right miter angle settings are not possible because a drive train prevents a saw blade from being adjusted through some or many angles which are necessary for certain applications. In addition, the drive train can be an obstruction when cutting different sizes and shapes of workpieces. In some situations, the workpiece cannot be placed at a desired location on the support surface to complete an intended cut. In addition, the drive train can present an unanticipated risk to the user, if the user does not understand or is unaware of the limitations of the miter saw when cutting tall or atypical workpieces. Therefore there is a need for a saw which is configured to provide left and right miter cuts and zero miter cuts without interference from the various components of the saw, including the drive train.

SUMMARY

In accordance with one embodiment of the disclosure there is provided a miter saw having a motor and a drive to drive a saw blade for cutting a workpiece, in which the drive includes a chain drive operatively coupled between the motor and the saw blade. In another embodiment, a chain drive used in a miter saw is configured to provide a narrow profile such that a narrow drive train housing defining a narrow compartment for the chain drive does not interfere with or limit the user from making both left and right miter cuts.

In still another embodiment, the drive does not include meshed gears configured to direct power from the motor to the saw blade. Instead, the drive incorporates pulleys in a configuration which allows for a compact drive train that does not interfere with a workpiece during a standard cutting operation.

DETAILED DESCRIPTION

For the purposes of promoting an understanding of the principles of the embodiments disclosed herein, reference is now made to the drawings and descriptions in the following written specification. No limitation to the scope of the subject matter is intended by the references. The disclosure also includes any alterations and modifications to the illustrated embodiments and includes further applications of the principles of the disclosed embodiments as would normally occur to one skilled in the art to which this disclosure pertains.

Figure 1:
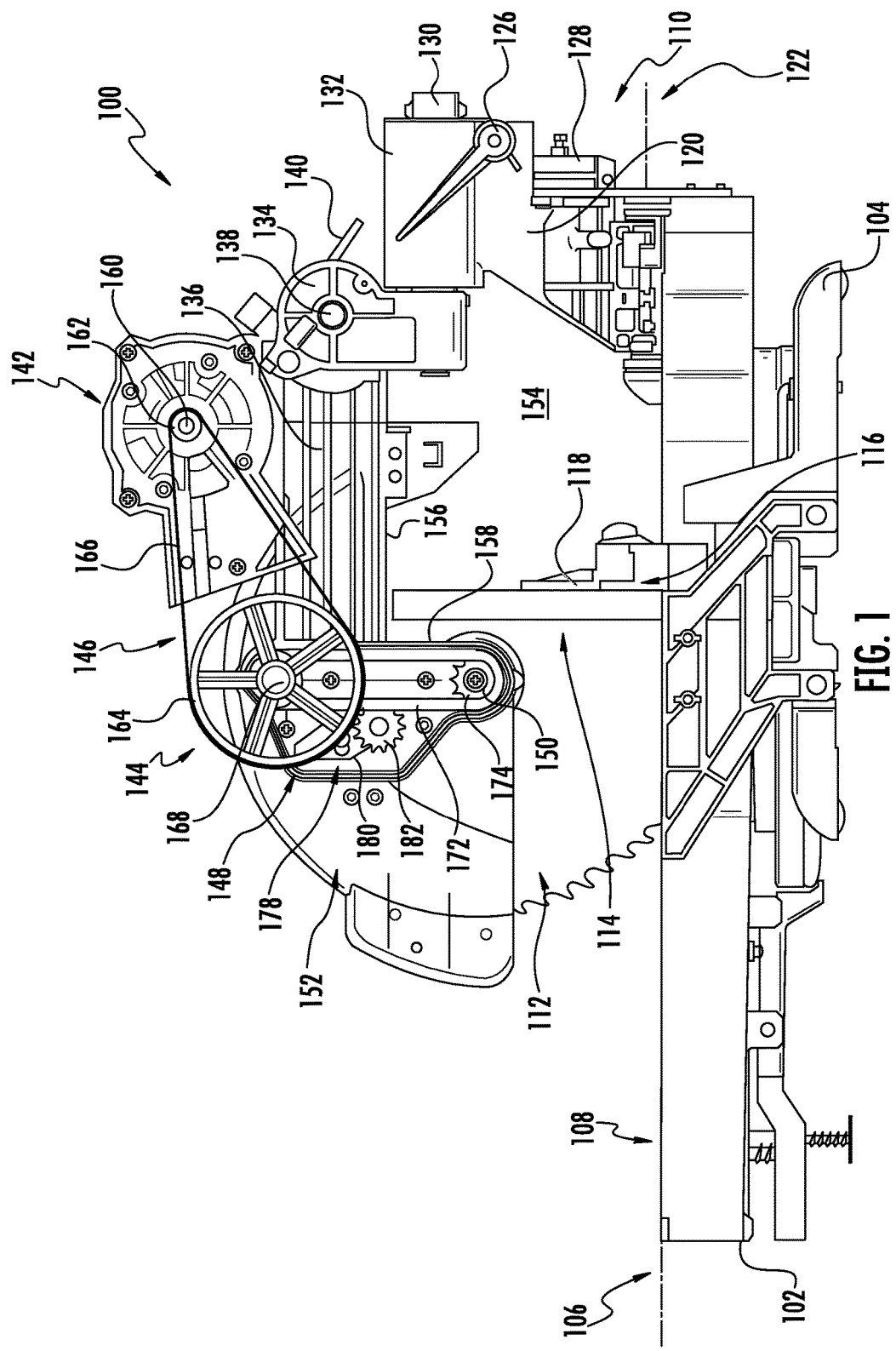
FIG. 1 is a schematic elevational side view of miter saw including a drive according to one disclosed embodiment.

FIG. 1 is a schematic elevational side view of saw device 100 including a turntable 102 supported by a base 104. The saw device 100 can be any type of saw devices including a miter saw, a bevel saw, a compound saw, a table saw, a planar, a mini saw, a handheld saw, or devices with a saw blade or other type of blade that is capable of penetrating into a workpiece. The turntable 102 may be rotatably adjustable on the base 104 about a pivot axis extending generally perpendicular to a plane 106 defined by a support surface 108 of the turntable 102. A support assembly 110 supports a cutting tool such as a saw blade 112 configured to cut a workpiece 114 supported on one side by the support surface 108 and on another side by a guide fence 116. The guide fence 116 includes a workpiece guide surface 118 upon which the workpiece is positioned for a cutting operation. The guide fence 116, as illustrated, may be adjustable to generally perpendicularly align with the turntable surface 108. In other embodiments, the guide fence 116 may be adjustable such that the workpiece guide surface 118 is inclined with respect to the turntable surface 108.

The cutting tool support assembly 110 includes a bevel arm 120 rotatably supported on the turntable 102 about an axis 122 generally parallel to the turntable surface and aligned with a cutting plane 124 of the blade 112. (See FIG. 3) The bevel arm 120 can be rotated left or right about the axis 122 to provide angled cuts into the workpiece. A pivotable handle 126 is provided to lock the bevel arm 120 at a selected location with a locking mechanism 128 as would be understood by one skilled in the art.

The support assembly 110 further includes one or more support bars 130 supported for sliding movement in a collar 132 of the bevel arm 120. One end of the bar(s) 130 extend(s) toward the saw blade 112 and terminates where a pivot mechanism 134 is rotatably coupled to a cutting arm 136. The cutting arm 136 is rotatably positionable around a pivot 138, the position of which is fixed and released by a handle (not shown) which is spring loaded with a spring 140. Since the support bars 130 slide within the collar 132, the saw blade 112 is positionable along the cutting plane 124 of the saw blade 122. In addition, since the saw blade 112 is coupled to the cutting arm 136, the position of the saw blade 122 is adjustable about an arc defined by the pivot 138. The saw device 100 and support assembly 110 may be configured as is known in the art to allow multiple positions of the cutting blade and to allow the saw device to perform a wide range of cuts into the workpiece.

Figure 2:
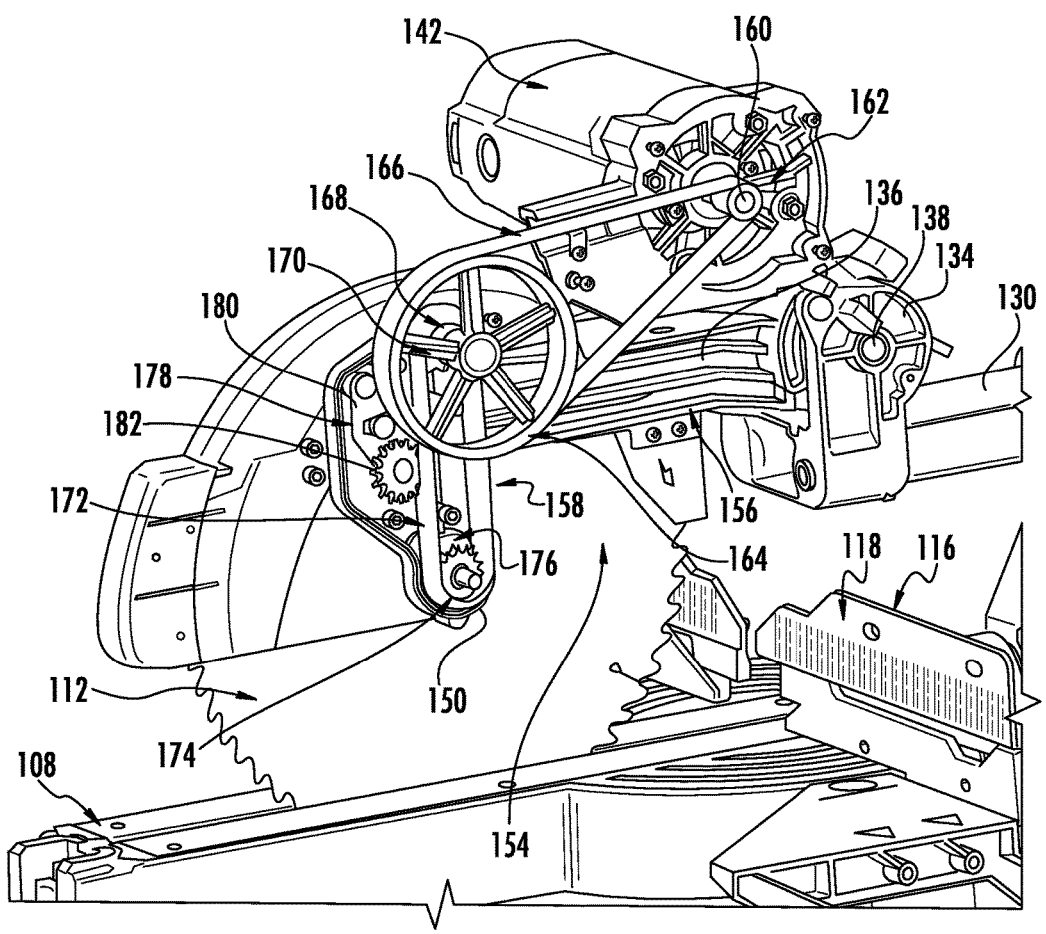
FIG. 2 is a schematic perspective view of the miter saw shown in FIG. 1.

As illustrated in FIGS. 1 and 2, the cutting arm 136 supports a blade drive including a motor 142 coupled to a drive assembly 144. The drive assembly 144 includes a first driver or drive train section 146 and a second driver or drive train section 148. The first drive train 146 extends from the motor 142 toward a location generally vertically disposed above a rotational axis 150 of the saw blade 112. The second drive train 148 extends from first drive train 146 toward the turntable surface 108 and the rotational axis 150, and may be oriented at a generally right angle with respect to the cutting arm 136. A housing (not shown) is preferably provided that covers the drive assembly 144 and particularly both the first and second drive trains 146 and 148. A blade guard 152 is also supported by the cutting arm 136 and may cover, in one embodiment, a top front quarter of the saw blade 112 as illustrated in FIGS. 1 and 2. Since the guard 152 covers the top front quarter of the saw blade 112, a clearance space 154 is provided which greatly increases the operating clearance for the workpiece 114. The clearance space 154 is delimited by a lower edge 156 of the cutting arm 136 and by either a back vertical edge 158 of the blade guard 152 or a portion of the drive train housing (not shown). It is contemplated that the drive train housing will generally follow the contour of the cutting arm and blade guard to maximize the clearance space 154.

The motor 142 includes a drive shaft 160 coupled to the first drive train 146 which includes a driving pulley 162 coupled to the drive shaft 160 for rotation with the drive shaft. In one embodiment, a driven pulley 164 is coupled to the driving pulley 162 by a belt 166. The driven pulley 164 is rotatably supported by the cutting arm 136 by an idler shaft 168 so that the idler shaft rotates with the driven pulley.

Figure 3:
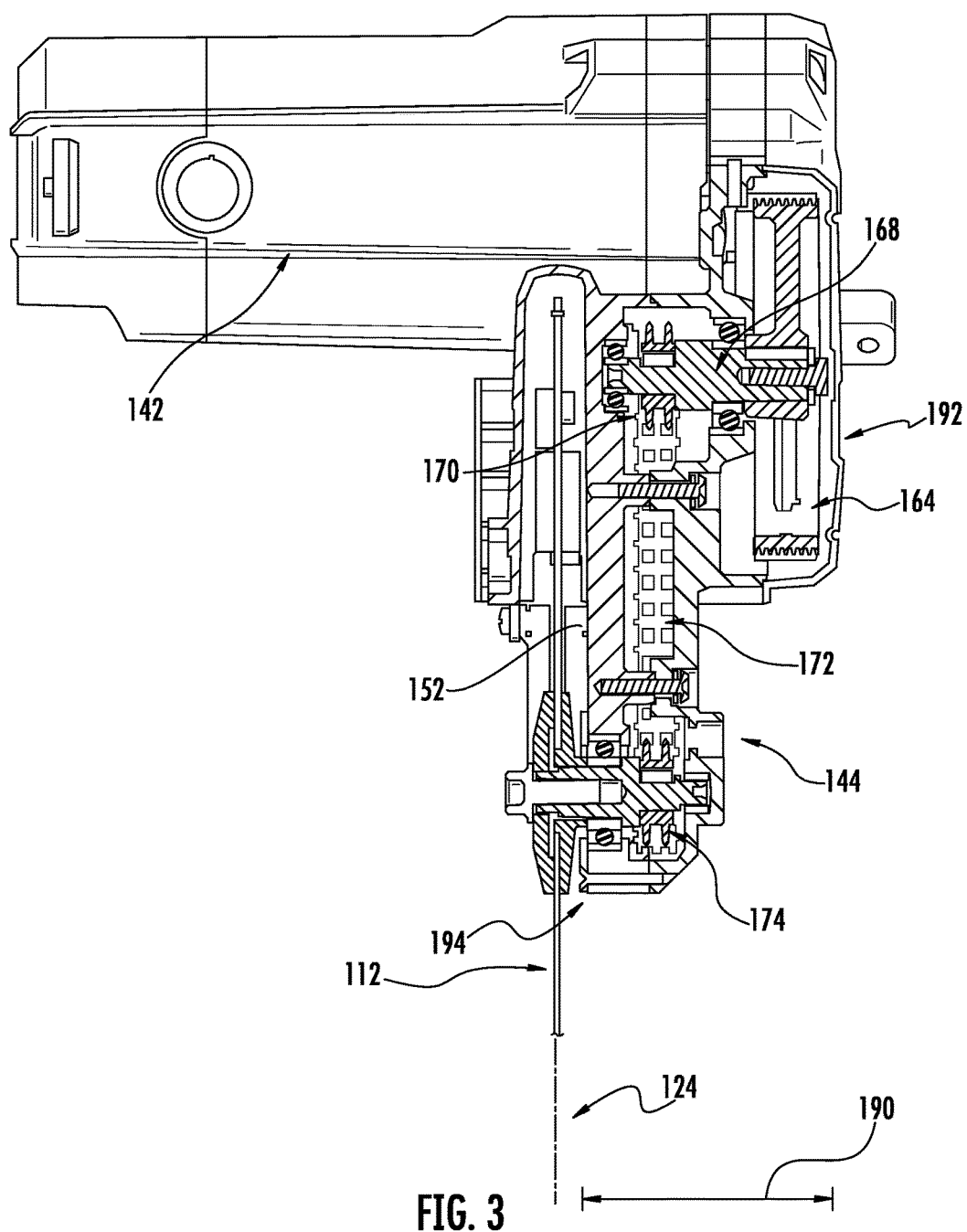
FIG. 3 is a schematic cross-sectional front view of a drive train and motor for the miter saw shown in FIG. 1.

The second drive train 148 includes a driving sprocket 170 disposed on the idler shaft 168 to rotate with the idler shaft and driven pulley 164, as best seen in FIG. 3. The driving sprocket 170 includes a plurality of teeth configured to engage a chain 172. A driven sprocket 174 is connected to a drive input to the cutting element, which in the illustrated embodiment is an arbor 176 at the rotational axis 150 of the saw blade. The driven sprocket includes a plurality of teeth configured to engage the chain 172. The driven sprocket is rotationally fixed to the arbor so that the arbor rotates with the driven sprocket. The arbor 176 is configured to rotationally engage the saw blade 112 in a known manner so that the saw blade rotates with the arbor, and thus with the driven sprocket 174. The driven sprocket is a drive input for the saw blade. It is understood that for other types of workpiece cutting elements the arbor 176 may be coupled to the cutting element in an appropriate manner to drive the cutting element accordingly. For instance, the cutting element 112 may be a reciprocating blade and the arbor 176 engaged to a mechanism for converting rotation of the arbor to a reciprocating movement of the cutting element.

The chain 172 extends from the driving sprocket 170 to the driven sprocket 174 and may be maintained at a suitable tension by a tensioning mechanism 178 disposed adjacent to the chain 172. The tensioning mechanism 178 may include an adjuster 180 and a sprocket 182 configured to engage the chain 172. The adjuster 180 is configured to position the sprocket 182 closer to or further away from the chain to maintain the chain at a desired tension. The adjuster 180, in different embodiments, may be controlled either manually, electronically, automatically through the force of a spring (not shown), or a combination thereof, as is known in the art.

The second drive train 148 includes the chain 172 as a part of the drive assembly 144 of the miter saw 100 to transmit the torque and speed of the motor 142 to the saw blade 112. In the illustrated embodiments of FIGS. 1 and 2, the drive assembly 144 combines a belt drive, in the form of the first drive train 144 and belt 166, with a chain drive, in the form of the second drive train 146 and chain 172, which cooperate to drive the blade 112. The belt drive transmits the torque and speed provided from the motor 142 to the idler shaft 168. In response thereto, the chain drive transmits the torque and speed of the idler shaft 168 to the blade 112. Speed reduction of the motor, in one embodiment, may be accomplished as illustrated by the belt drive portion of the drive assembly in which the circumference of the driven pulley 164 is larger than the circumference of the driving pulley 162. Alternatively speed reduction can be accomplished by adjusting the circumferences the driving sprocket 170 and the driven sprocket 174 of the chain drive portion of the drive assembly, either alone or in combination with the relative circumferences of the belt drive component.

Figure 4A:
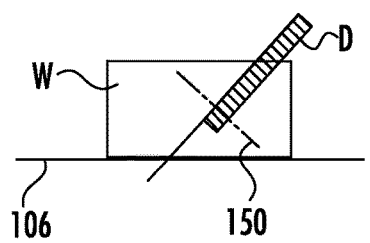
FIG. 4a is diagrams of a workpiece in a power tool of the prior art oriented for a right hand bevel cut.
Figure 4B:
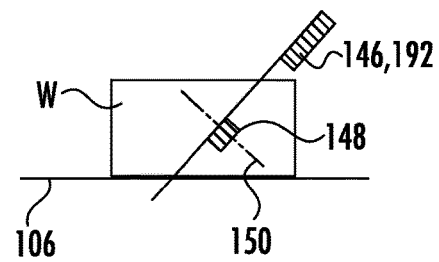
FIG. 4b is a diagram of a workpiece in a power tool according to the present disclosure oriented for a right hand bevel cut.

FIG. 3 is a schematic cross-sectional front view of the drive train 144 and the motor 142. In particular, a back portion of the chain 172 is illustrated as extending generally vertically from the driving sprocket 170 to the driven sprocket 174. The vertical orientation of the chain 172 allows the drive assembly 144 to be clear of the clearance space 154 (FIG. 1) which thus increases the cutting capacity of the miter saw. This increased clearance reduces or eliminates the chance of interference with tall, larger, or atypical work pieces 114 altogether, as illustrated in FIG. 1. Moreover, the drive assembly 144 also provides clearance for right angle or miter cuts in which the cutting blade 114 is pivoted about the bevel axis 122 at the side of the drive assembly (i.e., right side). It can be appreciated that the clearance space 154 at the side of the drive assembly 144 would ordinarily be reduced by the drive assemblies found in prior tools, but with the drive assembly 144 disclosed herein the drive trains 146, 148 are clear of the space 154. Thus, as illustrated in FIG. 4a, the drive assembly D of a prior tool would interfere with the workpiece W at the illustrated bevel angle. On the other hand, as shown in FIG. 4b, the drive train 146 of the drive assembly 144 disclosed herein is clear of the workpiece W at the same bevel angle. It is noted that the drive train 148 is forward of the workpiece in the view of FIG. 4b so it cannot interfere with the workpiece.

While the chain 172 is illustrated as driving the driven sprocket 174 on the arbor 176, in another embodiment a belt is used instead of the chain 172. Likewise, in another embodiment, a chain is used in place of the belt 166. Consequently, in different embodiments, both drive trains may include belts only, chains only, or a combination of a chain and a belt. In still other configurations, additional chains and/or belts may be included.

As seen in FIG. 3, the drive assembly 144 includes a generally narrow profile or width when measured in a direction 190 substantially perpendicular to the cutting plane 124. The profile or width extends from a first side 192 of the drive assembly to a second side 194 of the drive assembly 144. In particular, the width of the drive, including the housing 192, is approximately less than a third of the length of the motor 142 when measured along a direction substantially perpendicular to the cutting plane 124. While the width of the drive assembly 144 is greater than a width of the blade guard 152 in the illustrated embodiments, other embodiments include a drive of different widths. In each embodiment, however, the width of the drive is generally sufficiently narrow to enable zero angle cuts and left and right angle cuts up to and including an angle of forty-five (45) degrees with respect to the plane of the cutting surface 106.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following embodiments. The following embodiments are provided as examples and are not intended to be limiting.

What is claimed is:

1. A power tool comprising:
   a workpiece support structure having a workpiece support surface for supporting a workpiece thereon;
   a motor supported by said workpiece support structure;
   a cutting element configured to perform a cut in a workpiece, said cutting element having a drive input for driving the cutting element to perform the cut, said drive input configured to rotate about a first axis of rotation;
   a drive assembly coupling said motor to said cutting element, including;
   a first drive train extending from said motor to an offset position that is offset from said drive input; and
   a second drive train comprising:
   a second driving sprocket connected to said first drive train at the offset position in such a way that the first drive train drives the second driving sprocket about a second axis of rotation;
   a second driven sprocket fixedly coupled to said drive input and configured such that rotation of said second driving sprocket rotates said drive input; and
   a second chain engaging said second driving sprocket and said second driven sprocket and configured such that rotation of said second driving pulley or sprocket rotates said second driven sprocket, wherein said first and second drive trains are arranged such that a line connecting said second axis of rotation to said first axis of rotation is perpendicular to said first axis of rotation and arranged in a plane that is perpendicular to said workpiece support surface,
   wherein said cutting element defines a cutting plane, and said drive assembly is arranged entirely on a first side of said cutting plane,
   wherein said cutting plane intersects said motor such that a first portion of said motor is arranged on the first side of the cutting plane, and a second portion of said motor is arranged on a second side of the cutting plane, said first portion having a first length measured parallel to the first axis of rotation and said second portion having a second length measured parallel to the first axis of rotation, and the second length is greater than the first lengthy,
   wherein said drive assembly further comprises a drive housing that defines a first end side of the drive assembly, the drive assembly having a second opposite end side, said first and second drive trains being entirely positioned between said first and second end sides,
   wherein a distance between said first and second end sides measured along a direction parallel to said workpiece support surface and parallel to said first axis of rotation is less than one-third of an overall length of said motor measured along said direction, and
   wherein said second drive train includes a tensioning mechanism engaging said second chain between said second driving sprocket and said second driven sprocket, said tensioning mechanism comprises:
   a tensioning sprocket engaging said second chain and an adjuster configured to position the tensioning sprocket closer to or further away from said second chain so as to adjust a tension of said second chain.

2. The power tool according to claim 1, wherein said first drive train includes:
   a first driving pulley or sprocket coupled to an output of said motor;
   a first driven pulley or sprocket at said offset position and connected to said second driving sprocket; and
   a first belt or chain engaged between said first driving pulley or sprocket and said first driven pulley or sprocket, said line connecting a second axis of rotation of said first driven pulley or sprocket to said first axis of rotation.

3. The power tool according to claim 2, wherein said second driving sprocket is coupled for rotation with said first driven pulley or sprocket about said second axis of rotation.

4. The power tool according to claim 2, wherein a third axis of rotation about which said first driving pulley or sprocket is configured to rotate is vertically above said second axis of rotation relative to said workpiece support surface.

5. The power tool according to claim 2, wherein:
   said first driving pulley or sprocket has a first diameter; and
   said first driven pulley or sprocket has a second diameter that is greater than the first diameter such that said first driven pulley or sprocket rotates at a slower rotational speed than said first driving pulley or sprocket.

6. The power tool according to claim 1, wherein said offset position is vertically above said drive input of said cutting element relative to said workpiece support surface.

7. The power tool according to claim 6, wherein said first and second drive trains define a clearance space between said drive assembly and said workpiece support surface that extends vertically above said drive input of said cutting element to provide clearance for a workpiece.

8. The power tool according to claim 1, further comprising a bevel arm apparatus supporting said motor, cutting element and drive assembly on said workpiece support structure and configured to pivot said motor, cutting element and drive assembly to a bevel angle relative to said workpiece support surface.

9. The power tool according to claim 8, wherein said drive assembly is configured to define a clearance space between said drive assembly and said workpiece support surface sufficient to permit pivoting by said bevel arm apparatus and said cutting element to a bevel angle of 45 degrees with respect to said workpiece support surface.

10. A power tool comprising:
    a workpiece support structure having a workpiece support surface for supporting a workpiece thereon;
    a motor supported by said workpiece support structure;

a cutting element configured to perform a cut in a workpiece, said cutting element having a drive input for driving the cutting element to perform the cut and being configured to rotate about a first axis of rotation;

a drive assembly coupling said motor to said cutting element, including;

a first drive train comprising:

a first driving pulley coupled to an output of said motor and configured to rotate about a third axis of rotation;

a first driven pulley configured to rotate about a second axis of rotation at an offset position that is offset from said third axis of rotation; and a first belt engaged between said first driving pulley or sprocket and said first driven pulley or sprocket, said first axis of rotation being vertically above said second axis of rotation relative to said workpiece support surface; and a second drive train comprising:

a second driving sprocket fixedly connected to said driven pulley at the offset position in such a way that the first drive train drives the second driving sprocket;

a second driven sprocket fixedly coupled to said drive input and configured such that rotation of said second driving sprocket rotates said drive input; and a second chain engaging said second driving sprocket and said second driven sprocket and configured such that rotation of said second driving sprocket rotates said second driven sprocket, wherein said cutting element defines a cutting plane, and said drive assembly is arranged entirely on a first side of said cutting plane, wherein said cutting plane intersects said motor such that a first portion of said motor is arranged on the first side of the cutting plane, and a second portion of said motor is arranged on a second side of the cutting plane, said first portion having a first length measured parallel to the first axis of rotation and said second portion having a second length measured parallel to the first axis of rotation, and the second length is greater than the first length, wherein said drive assembly further comprises a drive housing that defines a first end side of the drive assembly, the drive assembly having a second opposite end side, said first and second drive trains being entirely positioned between said first and second end sides; and wherein a distance between said first and second end sides measured along a direction parallel to said workpiece support surface and parallel to said first axis of rotation is less than a third of an overall length of said motor measured along said direction, wherein said second drive train includes a tensioning mechanism engaging said second chain between said second driving sprocket and said second driven sprocket.

11. The power tool according to claim 10, wherein said second drive train is arranged such that a line connecting said first axis of rotation to said second axis of rotation is perpendicular to said first axis of rotation and arranged in a plane that is perpendicular to said workpiece support surface.

12. The power tool according to claim 10, wherein:

said first driving pulley has a first diameter; and said first driven pulley has a second diameter that is greater than the first diameter such that said first driven pulley rotates at a slower rotational speed than said first driving pulley.

13. The power tool according to claim 10, further comprising a tensioning mechanism that comprises:

a tensioning sprocket engaging said second chain; and an adjuster configured to position the tensioning sprocket closer to or further away from said second chain so as to adjust a tension of said second chain.

* * * * *

UNITED STATES PATENT AND TRADEMARK OFFICE
CERTIFICATE OF CORRECTION

PATENT NO. : 10,369,640 B2  
APPLICATION NO. : 15/101948  
DATED : August 6, 2019  
INVENTOR(S) : Plamen V. Marinov Page 1 of 1

It is certified that error appears in the above-identified patent and that said Letters Patent is hereby corrected as shown below:

In the Claims

In Claim 1, at Column 5, Line 64, delete the word "lengthy" and insert the word --length-- in its place.

Signed and Sealed this  
Seventh Day of January, 2020

Andrei Iancu  
*Director of the United States Patent and Trademark Office*